United States Patent [19]

Marze

[11] 4,207,182

[45] Jun. 10, 1980

[54] POLYMERIC COMPOSITIONS FOR MEMBRANES

[75] Inventor: Xavier Marze, Lyons, France

[73] Assignee: Rhone-Poulenc Industries, Paris, France

[21] Appl. No.: 740,656

[22] Filed: Nov. 10, 1976

[30] Foreign Application Priority Data

Nov. 14, 1975 [FR] France ................................ 75 35420

[51] Int. Cl.² ...................... B01D 13/00; C08G 23/00
[52] U.S. Cl. .................................. 210/23 F; 210/490;
210/500 M; 264/45.5; 427/246; 428/304;
521/27
[58] Field of Search ............ 210/500 M, 321 R, 23 F;
55/16, 158; 260/2.2 R, 2.5 AY; 23/258.5 M;
428/304; 204/180 P; 521/25, 30, 27; 264/41,
45.1, 45.5; 427/244, 245, 246

[56] References Cited

U.S. PATENT DOCUMENTS

| | | | |
|---|---|---|---|
| 3,615,024 | 10/1971 | Michaels | 210/500 M X |
| 3,709,841 | 1/1973 | Quentin | 210/500 M X |
| 3,868,314 | 2/1975 | Mizutani et al. | 210/500 M X |
| 4,026,977 | 5/1977 | Bourganel | 210/500 M X |
| 4,029,582 | 6/1977 | Ishii et al. | 210/500 M |
| 4,035,291 | 7/1977 | Chiang et al. | 210/500 M X |

*Primary Examiner*—Frank A. Spear, Jr.
*Attorney, Agent, or Firm*—Stevens, Davis, Miller & Mosher

[57] ABSTRACT

A mixture of at least one non-sulphonated polysulphone and at least one sulphonated polysulphone, this mixture consisting of 10 to 30% by weight of a sulphonated polysulphone which has a theoretical exchange capacity of from 500 to 1,200 meq/kg is provided. Such mixtures enable one to obtain semi-permeable membranes using relatively concentrated solutions of the mixtures. The resulting membranes are particularly suitable for use in ultrafiltration.

23 Claims, No Drawings

POLYMERIC COMPOSITIONS FOR MEMBRANES

BACKGROUND OF THE INVENTION

The present invention relates to new polymeric compositions and their application in the production of semi-permeable membranes.

The use of semi-permeable membranes in separation processes such as reverse osmosis and ultrafiltration is known. For these applications it is desirable to produce a screen-supported or reinforced membrane, that is, a membrane in which is embedded a flexible support, which is often a woven fabric, non-woven fabric or a net, which support makes the membrane at the same time strong and easily manipulable, even with large-sized membranes. The production of screen-reinforced membranes is generally carried out by casting a solution of polymer on the reinforcement followed by removal of the solvent (particularly by evaporation and/or coagulation). The polymer solution is hereafter referred to as the "collodion", regardless of the nature of the polymer. When excessively dilute collodions are used, it is difficult to obtain a uniform coating, and if the cast collodion is thick, the collodion tends to spread out and overflow, and this leads to an irregular thickness. If the cast collodion is thin, the screen reinforcement may not be entirely covered; in addition, when the membrane is coagulated after the collodion has been cast, the inevitable ripples on the surface of the coagulating bath form surface irregularities (folds) on the membrane and, furthermore, the polymer (in a dilute collodion) coagulates incompletely and material breaks away therefrom and denatures the coagulant liquid by forming suspensions. It is therefore of very great interest, from an industrial point of view, to be able to use fairly concentrated solutions of the polymers.

Very many known polymers have been tried or used for making semi-permeable membranes. Polymers based on derivatives of polysulphones are interesting, essentially because of the chemical stability inherent in the very nature of polysulphones, even when they are made into membranes.

Membranes, made from polysulphones described in British Specification No. 1,238,180 are discussed in French Certificate of Addition No. 2,005,334. The production of these membranes is carried out using a collodion containing from 8 to 20% of polymer. If it is desired to make membranes from polysulphones using more concentrated solutions, for example containing at least 25%, such that the viscosity is greater than at least 15 poises, membranes suitable for ultrafiltration can no longer be obtained.

It has also been proposed to use sulphonated polysulphones (see for example, British Specifications No. 1,258,851 and No. 1,350,342). These polymers give interesting results, but one object of the invention is to improve them especially with respect to permeability.

Polymeric compositions derived from polymers of the polysulphone type have now been found, according to the present invention, which provide access to semi-permeable membranes which are industrially interesting and can be made from fairly concentrated collodions.

SUMMARY OF THE INVENTION

The compositions according to the present invention comprise a mixture of at least one non-sulphonated polysulphone and at least one sulphonated polysulphone, this mixture containing 8 to 60% by weight, and preferably 10 to 30% by weight, of a sulphonated polysulphone which has a theoretical exchange capacity (as defined in U.S. Pat. No. 3,709,841, the disclosure of which is hereby incorporated by reference) of 150 to 1,500 meq/kg (milliequivalents per kilogram of sulphonated polysulphone), preferably of between 500 and 1,200 meq/kg, the overall mixture generally having a theoretical exchange capacity of 100 to 400 meq/kg, and preferably of 120 to 350 meq/kg. The theoretical exchange capacity is determined as follows: the material is washed with a N/10 sodium carbonate solution and the amount of sodium carbonate which has not been absorbed is determined. The number of mols of sodium carbonate retained by the material is deduced from this, by the difference; the ratio of this number of mols (expressed in milliequivalents, abbreviated meq) to the weight of dry material is the theoretical exchange capacity.

DESCRIPTION OF THE PREFERRED EMBODIMENTS

The non-sulphonated polysulphones are generally polymers comprising recurring units of the formula:

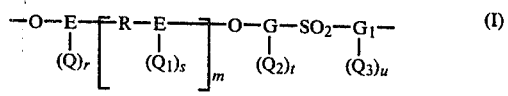

in which each of E, G and $G_1$, which are identical or different, represents an aromatic group, each of Q and $Q_1$, which are identical or different, represents a substituent which is inert with respect to sulphonation reactions, such as alkyl radicals having from 1 to 4 carbon atoms, and halogen atoms (F, Cl, Br or I), each of $Q_2$ and $Q_3$, which are identical or different, represents an electron-attracting group, such as a nitro, phenylsulphone, alkylsulphone, trifluoromethyl, nitroso or pyridyl group, each of r, s, t and u, which are identical or different, is zero or a positive integer from 1 to 4, i.e., less than 5, at least one of them being not greater than 3, i.e., less than 4, m is equal to 0, 1 or 2 and R represents the valency bond or a radical chosen from —CO—, —O— or —SO$_2$— or a divalent hydrocarbon radical such as an alkylene, alkylidene, cycloalkylene or arylene radical, said radical preferably having less than 7 carbon atoms.

The sulphonated polysulphones generally comprise a plurality of units of the formula:

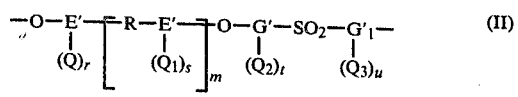

optionally combined with units of formula (I), Q, $Q_1$, $Q_2$, $Q_3$, r, s, t, u and m having the meanings given above and each of E', G' and $G'_1$, which are identical or different, differing from E, G and $G_1$ only by the presence of at least one sulphonic group on at least one of these three radicals.

By "sulphonic group" as used herein is meant an optionally salified —SO$_3$H group, for example the groups —SO$_3^\ominus$, $1/_n M^{n\oplus}$ where M represents a hydrogen ion or an NH$_4^\oplus$ ion, or an alkali metal ion or an alkaline earth metal ion (of valency n), where n is an integer equal to 1 or 2.

The mixture of sulphonated and non-sulphonated polysulphones can be made by any known manner, especially by mixing the polymers in the powdered stage and/or in solution, the solvents used in the latter case being, advantageously, solvents common to the sulphonated polysulphones and to the non-sulphonated polysulphones. If the sulphonated polysulphone and/or the non-sulphonated polysulphone is used in solution, a composition according to the invention can be obtained in solution, which can either be used without further treatment or evaporated in such a way as to obtain the compositions according to the invention in the solid state.

The solutions of polymeric mixture described above are also part of this invention, especially the solutions in polar aprotic solvents, the polymer concentration in these solutions being less than saturation and generally at least 20% by weight, and preferably at least 25% by weight. These solutions can contain other solvents or non-solvents, in particular ketones and ethers such as acetone or dioxane, or equally salts such as the salts of strong mineral acids or organic carboxylic acids with alkali metal or alkaline earth metals.

As the polar aprotic solvent, N-methylpyrrolidone (NMP) is preferably used.

The polymeric compositions according to the invention can be made into shaped articles, and more particularly membranes of which they form the active constituent.

These membranes can be ordinary membranes with ion exchange properties which can be prepared in different ways, for example by hot pressing, by calendering and by casting from solution and evaporating. They are generally dense membranes.

The membranes can also be composite membranes where the compositions according to the invention are deposited in the form of a fine layer (e.g. 0.1 to 10μ) on a porous support (which can be an ultrafiltration membrane).

The membranes can be screen-reinforced membranes, the screen reinforcement generally consisting of 20 to 80% by weight of the total weight of screen reinforcement + active constituent. A screen reinforcement is a reinforcing support, for example a woven fabric, a non-woven fabric, a paper, a net or a grid. These screen-reinforced membranes can be prepared by casting a solution onto the screen reinforcement and evaporating the solvent. The screen-reinforced membranes can be, for example, dense membranes or composite membranes (as described above) or anisotropic membranes (as described below).

The membranes can be asymmetric or anisotropic membranes, possessing (a) a layer which is either dense or has pores of small diameter (i.e. microporous), this layer playing the role of the semi-permeable membrane and (b) a porous layer or one which has pores of diameter greater than those of layer (a), this second layer playing the role of the reinforcing support. Such membranes can be prepared by casting a solution of a polymer mixture of this invention on a support and then coagulating one of the faces of the liquid film using a non-solvent for the polymer.

According to a preferred process for preparing ultrafiltration membranes according to the invention, a solution of the polymer mixture is cast on a support which has the desired shape, for example planar, conical or tubular, and thereafter, the liquid film, on its support, is immersed in a coagulating bath. That is to say a liquid which is a non-solvent for the polysulphones is used, whether the polysulphones are sulphonated or not; this non-solvent liquid is preferably miscible with the solvent used for the polymer mixture. Advantageously this coagulating bath is of pure water but it is also possible to use solutions containing, in an amount of, preferably, less than 10% by weight, organic solvents or salts. The temperature of this coagulating bath is suitably from +10° to 60° C., and preferably from 15° to 40° C. According to a preferred embodiment the coagulation is preceded by partial evaporation of the solvent, which favours the formation of a skin.

The semi-permeable membranes produced from the compositions according to the invention are particularly advantageous when in composite or asymmetric form, and when used in ultrafiltration. More specifically, these membranes are especially suitable for the ultrafiltration of aqueous solutions and/or suspensions. As examples of such solutions or suspensions there may be mentioned dairy products, milk or whey, biological liquids, particularly blood plasma, blood, haemodialysis baths, microbiological suspensions and enzyme suspensions or solutions, reaction media from biological reactors and enzymatic reactors, and sewage, especially sewage of municipal or industrial origin, for example sewage produced by paper pulp manufacturing units and tanneries (depilation baths).

Of course the membranes according to the invention are also particularly advantageous because of their good resistance both to acid or basic chemical agents and to temperature.

The following Examples further illustrate the present invention.

EXAMPLE 1

There is used (a) a non-sulphonated polysulphone (hereafter designated by the letters PS) comprising a plurality of units of the formula

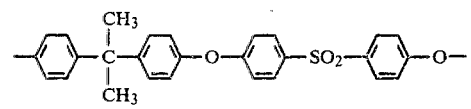

and with a specific viscosity (melt index measured according to ASTM standard D 1238) of 0.7 g/min (polysulphone P.1700 sold by Union Carbide), and (b) a sulphonated polysulphone in the form of the sodium salt, having a theoretical exchange capacity of 946 meq/kg and obtained by sulphonation of the non-sulphonated polysulphone defined under (a). This sulphonated polysulphone is hereafter designated by the letters PSS. Its viscosity at 25° C. in dimethylacetamide (at a concentration of 400 g/l) is 141 poises.

A reactor, at ambient temperature, equipped with a stirrer, is charged with 73 g of N-methylpyrrolidone (NMP) and 5.4 g of PSS.

When the PSS has dissolved, 21.6 g of PS are added. Stirring is continued until all has completely dissolved.

A clear and homogeneous collodion is obtained, having a viscosity of 56 poises (at 25° C.) and containing 27% by weight of dry polymeric materials (ratio of PS/PSS: 80/20).

This collodion is cast on a sheet of glass to a thickness of 0.2 mm. The whole is immersed for 5 minutes in a bath of water at 20° C. The membrane becomes detached and is washed in water until all the residual NMP has been removed.

A membrane is thus obtained having an ultrafiltration rate for pure water at 2 bars (differential pressure between one side of the membrane and the other) of 6,500 l/day.m$^2$.

With an aqueous solution of 4 g/l of dextran (molecular weight 110,000), the membrane gives, under the same conditions, an ultrafiltration rate of 2,070 l/day.m$^2$ with a rejection rate with respect to the dextran of 19%.

Comparative test:

A collodion free of PSS and containing 27% by weight of PS dissolved in NMP is prepared. This collodion has a viscosity of 63 poises at 25° C. (the viscosity for a concentration of 20% is only 9 poises). Coagulation is carried out as for the PS/PSS mixture. A membrane is obtained which has an ultrafiltration rate of zero at 2 bars. At 3.5 bars the rate is also zero.

EXAMPLE 2

A one liter reactor, at ambient temperature, equipped with a stirrer, is charged with 160 g of acetone, 400 g of NMP and 48 g of PSS (as used in Example 1).

When the PSS has dissolved, 192 g of PS (as used in Example 1) are added. Stirring is continued until the whole is dissolved.

A collodion is obtained, having a viscosity of 55 poises and a polymer content of 30% by weight (ratio of PS/PSS: 80/20).

This collodion is cast and coagulated as in Example 1.

The ultrafiltration membrane obtained is used to treat an aqueous solution of 4 g/l of dextran (molecular weight 110,000). At 2 bars, an ultrafiltration rate of 1,550 l/day.m$^2$ is observed, the rejection rate being 62%.

EXAMPLE 3

Example 2 is repeated, but the coagulation is preceded by an evaporation achieved by sweeping the liquid film with a stream of nitrogen at 500 l/hour. The sweeping is carried out with a series of jets 162 mm long and 2 mm wide, the jets being 5 mm above the surface of the collodion, which passes under the jets at the rate of 20 mm/sec. A membrane is obtained which has an ultrafiltration rate of 1,220 l/day.m$^2$, at 2 bars, and, for the same solution of dextran, the rejection rate is 81%.

EXAMPLE 4

Proceeding as above, 16.9 g of PSS (as used in Example 1), followed by 50.6 g of PS (as used in Example 1), are dissolved in a mixture of 50 g of acetone and 132.5 g of NMP.

A collodion is obtained having a viscosity of 22 poises and a polymer content of 27% by weight (ratio of PS/PSS: 72/25).

The collodion is cast, evaporated by sweeping with nitrogen and coagulated, as indicated in Example 3.

A membrane is obtained with a flow rate of 5,000 l/day.m$^2$ for pure water at 2 bars. A permeability rate of 1,800 l/day.m$^2$ is obtained on ultrafiltering an aqueous solution of 4 g/l of dextran (molecular weight 110,000), the rejection rate being 57%.

Using evaporation by sweeping with nitrogen at 1,500 l/hour before coagulation, a membrane is obtained with a rejection rate for dextran of 100%, the permeability rate being 1,000 l/day.m$^2$.

This experiment was repeated, replacing the mixture of PS+PSS by a PSS of low capacity (250 meq/kg); i.e., the theoretical exchange capacity is substantially equal to the average capacity of the mixture of PS+PSS used previously in this Example 4. The collodion obtained has a viscosity of 32 poises. The collodion is cast, evaporated by sweeping with nitrogen, and coagulated as indicated in Example 3. A membrane is obtained with a flow rate of pure water of 700 l/day.m$^2$ at 2 bars, which is inferior to the results obtained with the mixture of PS+PSS.

EXAMPLE 5

10.15 g of PSS (as used in Example 1) followed by 57.45 g of PS (as used in Example 1) are dissolved in a mixture of acetone/NMP similar to that in Example 4.

A collodion is obtained, having a viscosity of 28 poises at 25° C., and a polymer content of 27% by weight (ratio of PS/PSS: 85/15).

Casting, evaporation and coagulation is carried out as in Example 3.

A membrane is obtained with a flow rate of pure water of 1,500 l/day.m$^2$ at 2 bars.

EXAMPLE 6

A 0.5 l reactor, at ambient temperature, equipped with a stirrer, is charged with 148 g of NMP, 2 g of NaNO$_3$ and 9 g of PSS (as used in Example 1).

After dissolution, 41 g of PS (as used in Example 1) are added.

A collodion is obtained, having a viscosity of 45 poises at 25° C. and a polymer content of 25% (ratio of PS/PSS: 82/18).

Casting and coagulation is carried out as in Example 1.

A membrane is obtained with a flow rate of pure water of 12,000 l/day.m$^2$.

EXAMPLE 7

A 0.5 l reactor, at ambient temperature, equipped with a stirrer, is charged with 185 g of NMP, 2.5 g of NaNO$_3$ and 12.5 g of PSS (as used in Example 1).

After dissolution, 50 g of PS (as used in Example 1) are added.

A collodion is obtained, having a viscosity of 42 poises at 25° C. and a polymer content of 25% (ratio of PS/PSS: 80/20).

Casting, evaporation and coagulation are carried out as in Example 3, but modified in that the flow rate of nitrogen is 250 l/hour instead of 500 l/hour.

A membrane is obtained, having the following properties:

Ultrafiltration rate for pure water at 2 bars: 10,000 l/day.m$^2$.

Ultrafiltration rate at 2 bars for an aqueous solution of 4 g/l of dextran (molecular weight 110,000): 5,500 l/day.m$^2$ (the rejection rate is zero).

Ultrafiltration rate at 2 bars for an aqueous solution containing 1 g/l of bovalbumin (molecular weight 70,000) and 5.85 g/l of NaCl: 2,000 l/day.m$^2$ (the rejection rate is 100%).

EXAMPLE 8

An 0.5 l reactor, at ambient temperature, equipped with a stirrer, is charged with 132.5 g of NMP, 50 g of acetone and 13.5 g of a sulphonated polysulphone in the acid form, having a theoretical exchange capacity of 1,004 meq/kg, which has been obtained by sulphonation of the non-sulphonated polysulphone defined in the first paragraph of Example 1. Its viscosity, measured at 25° C. in dimethylacetamide, at a concentration of 400 g/l, is 146 poises. This polysulphone in the acid form is designated hereafter by the term PSS (H+).

After dissolution, 54 g of PS, as used in Example 1, are added.

A collodion is obtained, having a viscosity of 25 poises at 25° C. and a polymer content of 27% (ratio of PS/PSS (H+): 80/20).

Casting, evaporation and coagulation are carried out under the conditions of Example 3.

A membrane is obtained, having the following properties:

Ultrafiltration rate for pure water at 2 bars: 4,070 l/day.m².

EXAMPLE 9

Example 8 is repeated with the following modifications: the acetone is replaced by the same weight of methyl ethyl ketone and the PSS used is in the form of the sodium salt, as used in Example 1, but with a theoretical exchange capacity of 963 meq/kg and a viscosity of 127 poises (measured at 25° C. in a solution containing 400 g/l in dimethylacetamide).

A collodion is obtained, having a viscosity of 18 poises at 25° C. Polymer content: 27% (ratio of PS/PSS: 80/20).

This collodion is cast and coagulated under the conditions of Example 1. The flow rate of pure water is found to be 22,400 l/day.m², at 2 bars.

EXAMPLE 10

A one liter reactor, at ambient temperature, equipped with a stirrer, is charged with 370 g of NMP, 5 g of NaNO₃ and 25 g of PSS (as used in Example 9).

After dissolution, 100 g of PS (as used in Example 1) are added.

A collodion is obtained, having a viscosity of 33 poises at 25° C. Polymer content: 25% (ratio of PS/PSS: 80/20).

Casting, evaporation and coagulation are carried out under the conditions of the second experiment of Example 4 (sweeping with 1,500 l/hour of nitrogen).

A membrane having a flow rate of 15,700 l/day.m² for pure water at 2 bars is obtained.

The experiment is repeated, altering the temperature (20° C.) of the coagulation water bath, this temperature being brought successively to +5° C. and +35° C.

Membranes which have a flow rate, for pure water at 2 bars, of, respectively, 9,000 l/day.m² and 23,200 l/day.m², are obtained.

EXAMPLE 11

Two solutions containing 15% by weight of polymer dissolved in NMP are mixed in equal proportions by weight, the polymers contained in the first and in the second of these solutions being PSS (H+) and PS, as used in Example 8.

The collodion obtained is cast on a glass plate so as to form a liquid film 0.2 mm thick. The whole is immersed in a coagulating bath consisting of an aqueous solution containing 200 g/l of NaCl, at 18° C.

A membrane having a flow rate of 55,000 l/day.m² for pure water at 2 bars is obtained.

I claim:

1. A membrane-forming composition useful for making ultrafiltration membranes from a polymer solution thereof having a polymer concentration higher than 20%, said composition comprising a mixture of at least one non-sulphonated polysulphone and at least one sulphonated polysulphone, this mixture containing 10 to 30% by weight of a sulphonated polysulphone which has a theoretical exchange capacity of from 500 to 1200 meq/kg.

2. A composition according to claim 1 in which the theoretical exchange capacity of the composition is from 120 to 350 meq/kg.

3. A composition according to claim 1 in which the non-sulphonated polysulphone consists essentially of recurring units of the formula:

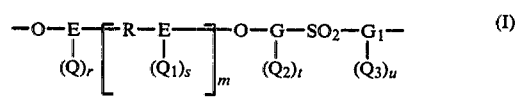

in which each of E, G and $G_1$, which are identical or different, represents an aromatic group, each of Q and $Q_1$, which are identical or different, represents a substituent which is inert with respect to the sulphonation reactions, each of $Q_2$ and $Q_3$, which are identical or different, represents an electron-attracting group, each of r, s, t and u, which are identical or different, is zero or a positive integer from 1 to 4, at least one of which is not greater than 3, m is equal to 0, 1 or 2 and R represents a valency bond or a radical which is selected from the group consisting of —CO—, —O— and —SO₂— and divalent hydrocarbon radicals, and the sulphonated polysulphone consists essentially of recurring units of the formula:

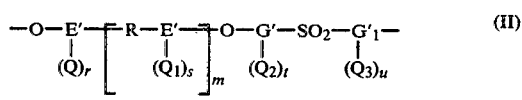

alone or in combination with units of formula (I), in which Q, $Q_1$, $Q_2$, $Q_3$, r, s, t, u and m are as defined above and E', G' and G'₁, which are identical or different, are as defined under E, G and $G_1$, respectively, except that at least one of them contains at least one sulphonic group.

4. A composition according to claim 3 in which the substituent which is inert with respect to sulphonation reactions is selected from the group consisting of alkyl radicals of 1 to 4 carbon atoms and fluorine, chlorine, bromine and iodine atoms.

5. A composition according to claim 3 in which the electron-attracting group is selected from the group consisting of nitro, phenylsulphone, alkylsulphone, trifluoromethyl, nitroso and pyridyl groups.

6. A composition according to claim 3 in which R is selected from the group consisting of alkylene, alkylidene, cycloalkylene and arylene radicals containing less than 7 carbon atoms.

7. A composition according to claim 6 in which R is the

radical.

8. A composition according to claim 3 in which r=s=t=u=0, m=1 or 2 and E, G and $G_1$ are each a para-phenylene radical.

9. A composition according to claim 1 which is in the form of a solution in at least one organic solvent containing at least 20% by weight of the said mixture.

10. A composition according to claim 9 which contains at least 25% by weight of the said mixture.

11. A composition according to claim 9 in which the organic solvent is a polar aprotic solvent.

12. A composition according to claim 11 in which the solvent is N-methylpyrrolidone.

13. A membrane formed from a composition as defined in claim 1.

14. A membrane according to claim 13 which is dense.

15. A membrane according to claim 13 which is screen-reinforced, the screen reinforcement constituting 20 to 80% by weight of the reinforced membrane.

16. A membrane according to claim 13 possessing a dense or microporous layer, and a porous layer.

17. In a method of ultrafiltration of a liquid the improvement in which the ultrafiltration membrane is one defined in claim 13.

18. Process for the preparation of a membrane suitable for ultrafiltration, which comprises casting a composition as defined in claim 1 in the form of a solution having a polymer concentration higher than 20% on a support and immersing the liquid film, on its support, in a coagulation bath.

19. A process for the preparation of a composition comprising a mixture of at least one non-sulphonated polysulphone and at least one sulphonated polysulphone, this mixture containing 10 to 30% by weight of a sulphonated polysulphone which has a theoretical exchange capacity of from 500 to 1200 meq/kg, said process comprising mixing the non-sulphonated polysulphone with the sulphonated polysulphone in the form of powders or solutions, or combinations thereof.

20. A process according to claim 19 wherein a solution is used, and, after mixing, the solvent of the solution is evaporated.

21. A membrane which is a composite membrane comprising a thin layer of membrane formed from a composition comprising a mixture of at least one non-sulphonated polysulphone and at least one sulphonated polysulphone, this mixture containing 10 to 30% by weight of a sulphonated polysulphone which has a theoretical exchange capacity of from 500 to 1200 meq/kg, and which is supported by a porous layer.

22. Process for the preparation of a membrane suitable for ultrafiltration, which comprises casting on a support a composition comprising a mixture of at least one non-sulphonated polysulphone and at least one sulphonated polysulphone, this mixture containing 10 to 30% by weight of a sulphonated polysulphone which has a theoretical exchange capacity of from 500 to 1200 meq/kg, said composition being in the form of a solution in at least one organic solvent containing at least 20% by weight of the said mixture, and immersing the liquid film, on its support, in a coagulation bath, the coagulation bath being water, alone or in combination with solvent and/or salt, and having a temperature of +10° to +60° C.

23. Process according to claim 22 in which the coagulation bath has a temperature of 15° to 40° C.

* * * * *